United States Patent
Arif et al.

(10) Patent No.: US 10,601,979 B2
(45) Date of Patent: *Mar. 24, 2020

(54) METHOD AND APPARATUS FOR MANAGING APPLICATION DATA USAGE

(71) Applicant: Samsung Electronics Co., Ltd., Suwon-si, Gyeonggi-do (KR)

(72) Inventors: Tasleem Arif, Noida (IN); Manoj Kumar, New Delhi (IN); Prakhar Avasthi, Ghaziabad (IN); Achintya Dixit, Lucknow (IN); Dhananjay Govekar, Mumbai (IN); Aleena Das, Pune (IN); Munwar Khan, South Delhi (IN); Sanket Magarkar, Noida (IN); Shashank Shekhar, Patna (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/363,190

(22) Filed: Mar. 25, 2019

(65) Prior Publication Data

US 2019/0222690 A1  Jul. 18, 2019

Related U.S. Application Data

(63) Continuation of application No. 15/240,428, filed on Aug. 18, 2016, now Pat. No. 10,244,102.

(30) Foreign Application Priority Data

Aug. 20, 2015 (IN) .......................... 2579/DEL/2015

(51) Int. Cl.
*H04M 1/725* (2006.01)
*G06F 3/0482* (2013.01)
(Continued)

(52) U.S. Cl.
CPC ...... *H04M 1/72583* (2013.01); *G06F 3/0482* (2013.01); *G06F 21/629* (2013.01); *G06F 2221/2111* (2013.01); *H04M 1/67* (2013.01)

(58) Field of Classification Search
CPC ...... G06F 13/28; G06F 13/4063; G06F 21/32; G06F 21/72; G06F 21/74; G06F 21/78;
(Continued)

(56) References Cited

U.S. PATENT DOCUMENTS

| 5,987,611 A | 11/1999 | Freund |
| 7,743,407 B2 | 6/2010 | Sprigg et al. |

(Continued)

FOREIGN PATENT DOCUMENTS

| CN | 104238717 A | 12/2014 |
| EP | 2 533 168 A1 | 12/2012 |
| WO | 2013/028136 A1 | 2/2013 |

OTHER PUBLICATIONS

Indian Office Action dated Jan. 24, 2020, issued in Indian Application No. 2579/DEL/2015.

*Primary Examiner* — Abiy Getachew
(74) *Attorney, Agent, or Firm* — Jefferson IP Law, LLP

(57) ABSTRACT

A method for operating an electronic device includes displaying a user-interface for a mode for controlling data usage on a display of the electronic device, in response to detecting an input for the user-interface, activating the mode, in the mode, identifying a first set of applications among a plurality of applications installed in the electronic device based on a predefined list, allowing first data usage for a first set of applications, and restricting second data usage for a second set of applications among the plurality of applications other than the first set of applications.

20 Claims, 15 Drawing Sheets

(51) Int. Cl.
*G06F 21/62* (2013.01)
*H04M 1/67* (2006.01)

(58) Field of Classification Search
CPC .... G06F 21/79; G06F 9/30003; G06F 21/602; G06F 9/30043; G06F 9/3877; G06Q 20/3672
See application file for complete search history.

(56) References Cited

U.S. PATENT DOCUMENTS

| | | |
|---|---|---|
| 2004/0148514 A1 | 7/2004 | Fee et al. |
| 2005/0198319 A1 | 9/2005 | Chan et al. |
| 2006/0090192 A1 | 4/2006 | Corby et al. |
| 2012/0291102 A1 | 11/2012 | Cohen |
| 2014/0317284 A1 | 10/2014 | Navarette et al. |

METHOD AND APPARATUS FOR MANAGING APPLICATION DATA USAGE

PRIORITY

This application is a continuation application of prior application Ser. No. 15/240,428, filed on Aug. 18, 2016, which has issued as U.S. Pat. No. 10,244,102 on Mar. 26, 2019 and was based on and claimed priority under 35 U.S.C § 119(a) of a Indian patent application number 2579/DEL/2015, filed on Aug. 20, 2015, in the Indian Intellectual Property Office, the disclosure of which is incorporated by reference herein in its entirety.

TECHNICAL FIELD

The present invention relates to a method and an apparatus for improving network performance and in particular relates to a method and an apparatus for managing application data usage.

BACKGROUND

With the increasing penetration of smart phones, easy availability and access to network infrastructure, and reduced prices of mobile data services, use of internet data has proliferated over years and is continuing to increase. As such, users are now able to access a wide range of services over applications, which are downloaded and installed on the smart phones. Examples of such applications include chat applications, mail applications, browser applications, messaging applications, e-commerce applications, social media applications, data based media applications, location-based service (LBS) applications, and search applications. In addition, the users are now able to connect with other users and share data such as images, videos, and music through various applications such as chat application and voice over IP (VOIP) applications. Moreover, quality of data being shared or accessed has improved dramatically. For example, present videos being shared or accessed are in high definition format. However, such an extensive usage has led to dramatic increase in consumption of network bandwidth. Consequently, network overload problems have increased resulting in poor user experience and increase in mobile data expenses over the period of data plan.

Various solutions are available that allow a user to manage the data usage among different applications and save data expenses. In one solution, in a networked environment, a central server monitors network or data access of client computers based on predefined rules indicating permission to data access. However, such solution necessities client-server architecture which cannot cater to individual needs. In addition, such solution requires an administration/supervisor to control the data access, thereby denying a simple control to individual users.

In another solution, the smart phones are manufactured/configured with data restriction features. In one another solution, applications providing data restriction features are downloaded and installed on the smart phones. In both solutions, the user selects applications installed on the smart phones and accordingly data access to the selected application is completely restricted. Thus, both foreground activities such as transmitting & receiving messages in chat sessions and background activities such as checking with an external server for updates are completely restricted. Further, the user can provide a threshold value of data usage in terms of percentage of total mobile data plan limit or a specific value of mobile data usage. When the data usage reaches the threshold value, the selected applications are automatically and completed blocked/restricted from accessing network.

However, in such solutions, the user has to navigate through the data restricting feature or application each time to select/deselect applications for managing the data usage. In addition, the selected applications are completely restricted from accessing network and the non-selected applications are completely allowed to access the network. Such management of data usage does not cater to individual user needs, thereby resulting in poor management of data usage.

In yet another solution, a network performance of a current foreground application is increased by allocating of entire network bandwidth to the current foreground application only. However, such solution is directed towards enhancing network performance or increasing network bandwidth for a single application only. Consequently, the other applications are deprived of the network bandwidth. Further, these solutions do not provide flexibility to users to manage the data usage according to individual needs. Thus, there exists a need for a solution to enable a user for managing application data usage in a quick and effective manner.

SUMMARY

A method for operating an electronic device includes displaying a user-interface for a mode for controlling data usage on a display of the electronic device, in response to detecting an input for the user-interface, activating the mode, in the mode, identifying a first set of applications among a plurality of applications installed in the electronic device based on a predefined list, allowing first data usage for a first set of applications, and restricting second data usage for a second set of applications among the plurality of applications other than the first set of applications.

An electronic device includes a display unit configured to display a user-interface for a mode for controlling data usage on a display of the electronic device, an analysing unit configured to, in response to detecting an input for the user-interface, activate the mode, in the mode, identify a first set of applications among a plurality of applications installed in the electronic device based on a predefined list, and a data controlling unit configured to, allow first data usage for a first set of applications, and restrict second data usage for a second set of applications among the plurality of applications other than the first set of applications.

BRIEF DESCRIPTION OF THE DRAWINGS

To further clarify advantages and aspects of the invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings, which are listed below for quick reference.

Figure 1:
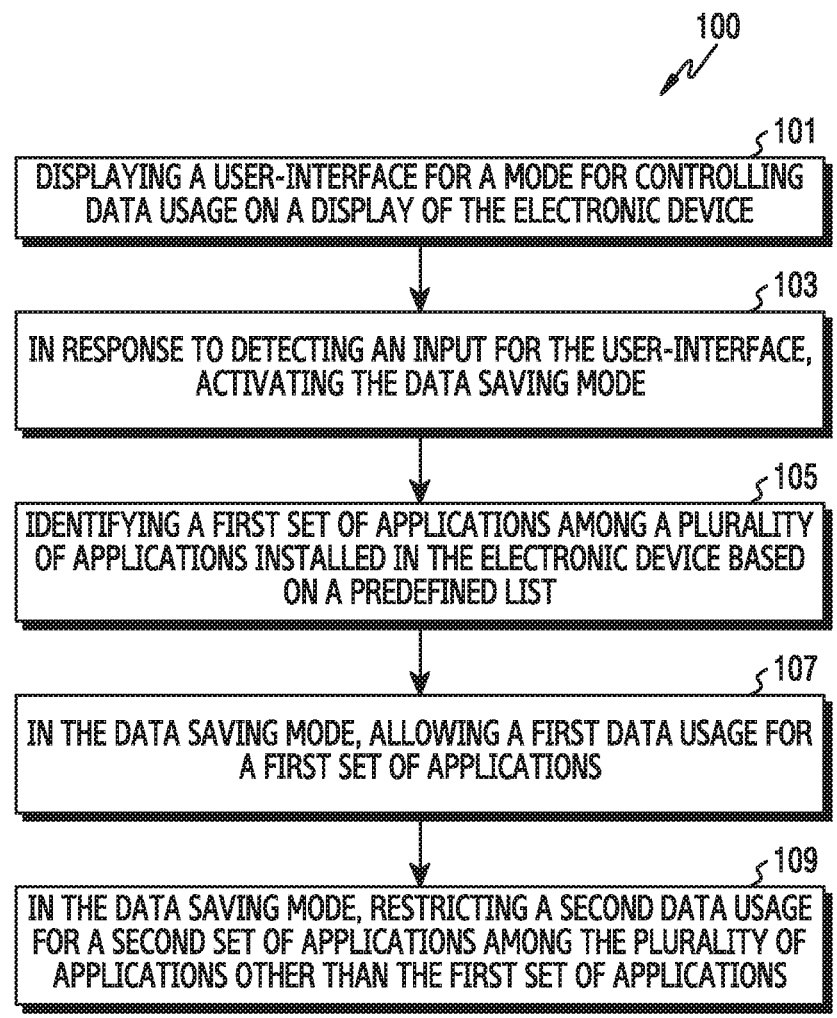
FIG. 1 illustrates an exemplary method for managing data usage by an electronic device, in accordance with an embodiment of present invention.

It may be noted that to the extent possible, like reference numerals have been used to represent like elements in the drawings. Further, those of ordinary skill in the art will appreciate that elements in the drawings are illustrated for simplicity and may not have been necessarily drawn to scale. For example, the dimensions of some of the elements in the drawings may be exaggerated relative to other elements to help to improve understanding of aspects of the invention. Furthermore, the one or more elements may have been represented in the drawings by conventional symbols, and the drawings may show only those specific details that are pertinent to understanding the embodiments of the invention so as not to obscure the drawings with details that will be readily apparent to those of ordinary skill in the art having benefit of the description herein.

DETAILED DESCRIPTION

It should be understood at the outset that although illustrative implementations of the embodiments of the present disclosure are illustrated below, the present invention may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching and illuminating some embodiments and their specific features and elements and does not limit, restrict or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having an ordinary skill in the art.

Reference is made herein to some "embodiments." It should be understood that an embodiment is an example of a possible implementation of any features and/or elements presented in the attached claims. Some embodiments have been described for the purpose of illuminating one or more of the potential ways in which the specific features and/or elements of the attached claims fulfil the requirements of uniqueness, utility and non-obviousness.

Use of the phrases and/or terms such as but not limited to "a first embodiment," "a further embodiment," "an alternate embodiment," "one embodiment," "an embodiment," "multiple embodiments," "some embodiments," "other embodiments," "further embodiment", "furthermore embodiment", "additional embodiment" or variants thereof do NOT necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or alternatively in the context of more than one embodiment, or further alternatively in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should NOT be necessarily taken as limiting factors to the attached claims. The attached claims and their legal equivalents can be realized in the context of embodiments other than the ones used as illustrative examples in the description below.

FIG. 1 illustrates an exemplary method 100 for managing data usage by an electronic device, according to one embodiment.

Referring to FIG. 1, the method 100 comprises providing a user-interface depicting a single-input data saving mode, receiving a selection of the single-input data saving mode on the user-interface from a user, the selection enabling the single-input data saving mode, identifying a first set of applications from a plurality of applications available in the electronic device based on a predefined list, and allowing a complete data usage for the first set of applications and restricting data usage for second set of applications from the plurality of applications. The single-input data saving mode may refer to a mode for allowing of transmitting and receiving foreground data and background data of selected applications and restricting transmitting and receiving background data of unselected applications while usage for foreground data of unselected applications is allowed. In other words, the single-input data saving mode may refer to a mode for controlling data usage. The selected applications may be selected by a user of the electronic device. The foreground data may refer to data for affecting a user experience regarding an application directly. In some embodiments, the foreground data may refer to data for user interface displayed in a display of the electronic device. For example, the foreground data may be data for transmitting a message in a chat application. The background data may refer to data for affecting user experience regarding the application indirectly. In some embodiments, the background data may refer to data for information not displayed in the display of the electronic device. For example, the background data may be data for checking an update of the application. The single-input data saving mode is only an exemplary term and may be used in other terms.

In step 101, the electronic device displays a user-interface for a mode for controlling data usage on a display of the electronic device. In some embodiment, the electronic device provides sounds for a mode for controlling data usage.

In step 103, in response to detecting an input for the user-interface, the electronic device activates the mode. Further, the electronic device receives selection of one or more applications from the user corresponding to the first set of applications.

In step 105, in the mode, the electronic device identifies a first set of applications among a plurality of applications installed in the electronic device based on a predefined list. Further, the first set of applications is a non-null set.

In step 107, the electronic device allows first data usage for a first set of applications. Further, the first set of applications includes one or more system applications associated with the electronic device or one or more user-selected applications installed on the electronic device. Further, allowing the complete data usages includes allowing foreground data usage and background data usage.

In step 109, the electronic device restricts second data usage for a second set of applications among the plurality of applications other than the first set of applications. Further, the second set of applications excludes one or more system applications associated with the electronic device. Further, restricting data usages includes allowing foreground data usage and restricting background data usage for the second set of applications running in foreground mode of the electronic device. Further, restricting data usages includes restricting foreground data usage and background data usage for the second set of applications running in background mode of the electronic device.

Figure 2:
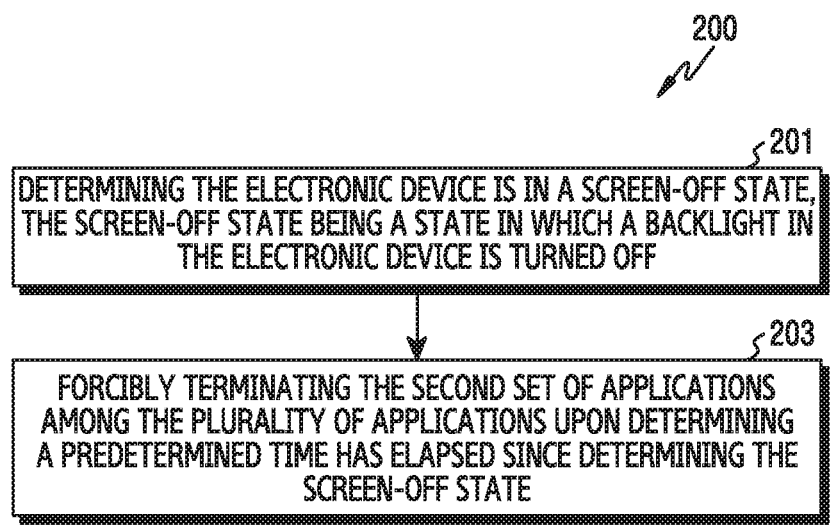
FIG. 2 illustrates an exemplary method for terminating a second set of applications by an electronic device, in accordance with an embodiment of present invention.

FIG. 2 illustrates an exemplary method 200 for terminating a second set of applications by an electronic device, in accordance with an embodiment of present invention.

Referring to FIG. 2, in step 201, the electronic device determines the electronic device is in a screen-off state. The screens-off state is a state in which a backlight in the electronic device is turned off. The screen-on state is a state in which a backlight in the electronic device 400 is turned on.

In step 203, the electronic device forcibly terminates the second set of applications among the plurality of applications upon determining a predetermined time has elapsed since determining the screen-off state. Further, the second set of applications excludes one or more applications currently running audio service in background mode of the electronic device.

Figure 3:
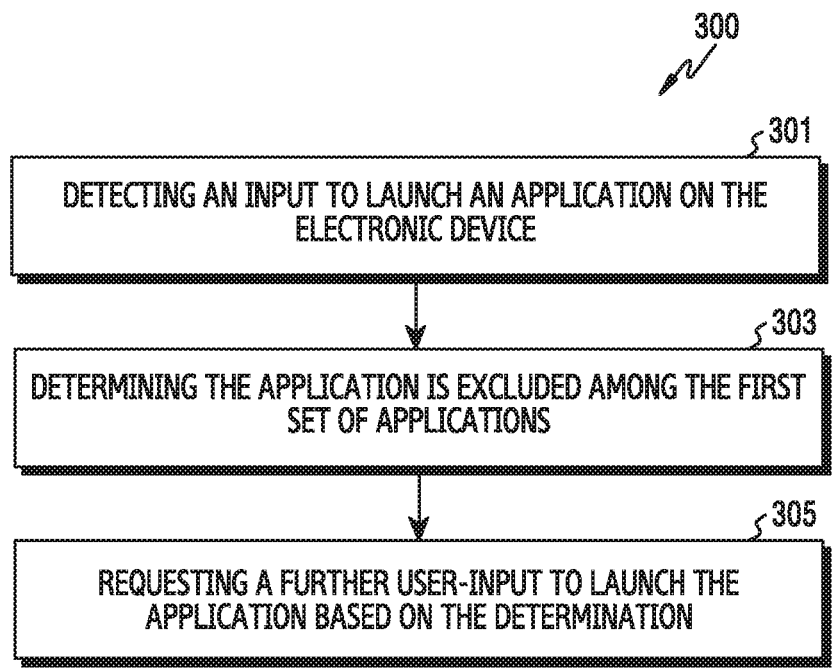
FIG. 3 illustrates an exemplary method for launching the application by an electronic device, in accordance with an embodiment of present invention.

FIG. 3 illustrates an exemplary method 300 for launching the application by an electronic device, in accordance with an embodiment of present invention.

Referring to FIG. 3, in step 301, the electronic device detects the input to launch an application on the electronic device. the electronic device receives a user-input to launch an application on the electronic device.

In step 303, the electronic device determines if the application is excluded among the first set of applications. In other words, the electronic device determines the application is excluded from the first set of applications.

In step 305, the electronic device requests a further input before the launch of the application, based on the determination. In other words, the electronic device requests a further user-input to launch the application based on whether the application is excluded among the first set of applications.

Figure 4:
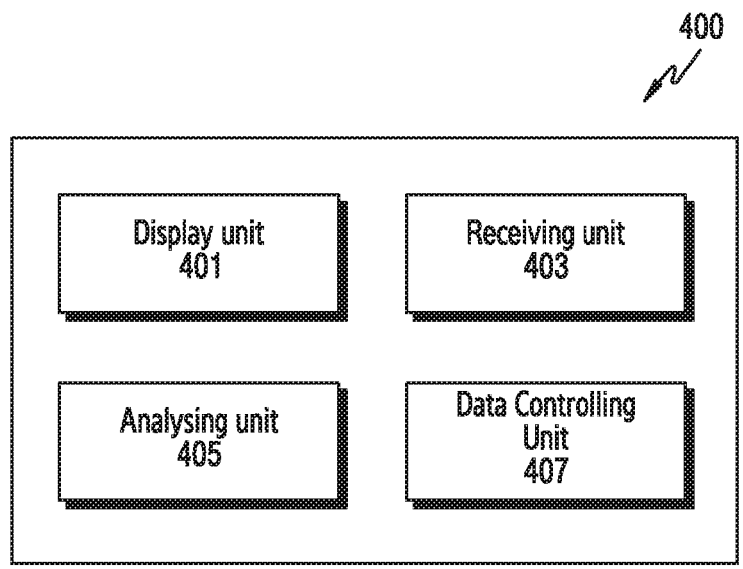
FIG. 4 illustrates an exemplary electronic device for managing data usage, in accordance with an embodiment of present invention.

FIG. 4 illustrates an exemplary electronic device for managing data usage, in accordance with an embodiment of present invention.

Referring to FIG. 4, the present invention further provides an electronic device 400 implementing the previously mentioned method as illustrated in FIG. 1, in accordance with an embodiment. Examples of the electronic device 400 include smart phone, laptop, tablet, smart or Internet Protocol television (IPTV), printer, and Personal Digital Assistance (PDA). In such embodiment, the electronic device 400 includes display unit 401 adapted to depict a single-input data saving mode in a user-interface. The electronic device 400 further includes a receiving unit 402 adapted to receive a selection of the single-input data saving mode on the user-interface from a user, the selection enabling the single-input data saving mode. The electronic device 400 further includes an analysing unit 403 adapted to identify a first set of applications from a plurality of applications available in the electronic device 400 based on a predefined list, upon enablement of the single-input data saving mode. The electronic device 400 further includes a data controlling unit 404 adapted to allow a complete data usage for the first set of applications and restricting a data usage for second set of applications from the plurality of applications.

Further, the analysing unit 403 is adapted to determine the electronic device 400 is in a screen-off state, the screen-off state being a state in which a backlight in the electronic device 400 is turned off. In response to determination of the screen-off state, the data controlling unit 404 is further adapted to determine a predetermined time has elapsed since determining the screen-off state. In response to determination of elapsed predetermined time, the data controlling unit 404 is further adapted to forcibly terminate the second set of applications from the plurality of applications.

It would be understood that the electronic device 400, the display unit 401, and the receiving unit 402 may include various software components or modules as necessary for implementing the invention. Further, the analysing unit 403 and the data controlling unit 404 can be implemented as hardware modules or software modules or a combination of hardware and software modules to manage the data usage upon enabling the single-input data saving mode. Furthermore, the analysing unit 403 and the data controlling unit 404 can be implemented as a single unit performing all the functions.

For the ease of understanding, the forthcoming descriptions of FIGS. 5-10 illustrate the example manifestations/screenshots depicting the implementation of various aspects of the present invention by the electronic device 400. However, it may be strictly understood that the forthcoming examples shall not be construed as being limitations towards the present invention and the present invention may be extended to cover analogous manifestations through other type of like mechanisms.

In accordance with the present invention, the electronic device 400 includes a single-input data saving mode. Upon completing initial configuration set up of the electronic device 400, the single-input data saving mode is available on the electronic device 400. The single-input data saving mode enables the electronic device 400 to manage data usage by allowing complete data usage to selected applications from one or more applications available in the electronic device 400. As would be understood, the term 'data usage' means an amount of data communicated between the electronic device and a network (not shown in the figure), and may refer to the amount of data communicated using a particular network interface (not shown in the figure) of the electronic device or a total amount of data communicated via all network interfaces (not shown in the figure) of the electronic device.

Further, the single-input data saving mode can be accessed via a user-interface provided on the electronic device 400. Thus, a user of the electronic device 400 provides a single user-input to access the single-input data saving mode on the user-interface. Examples of the user-input includes touch based gesture input, non-touch based gesture input, input from an input device communicatively coupled to the electronic device 400.

In one aspect of the present invention, the user-interface is provided as quick access panel. The quick access panel provides quick access to various applications and/or functionalities available in the electronic device 400. In an example, the single-input data saving mode is available as an icon on the quick access panel.

Figure 5:
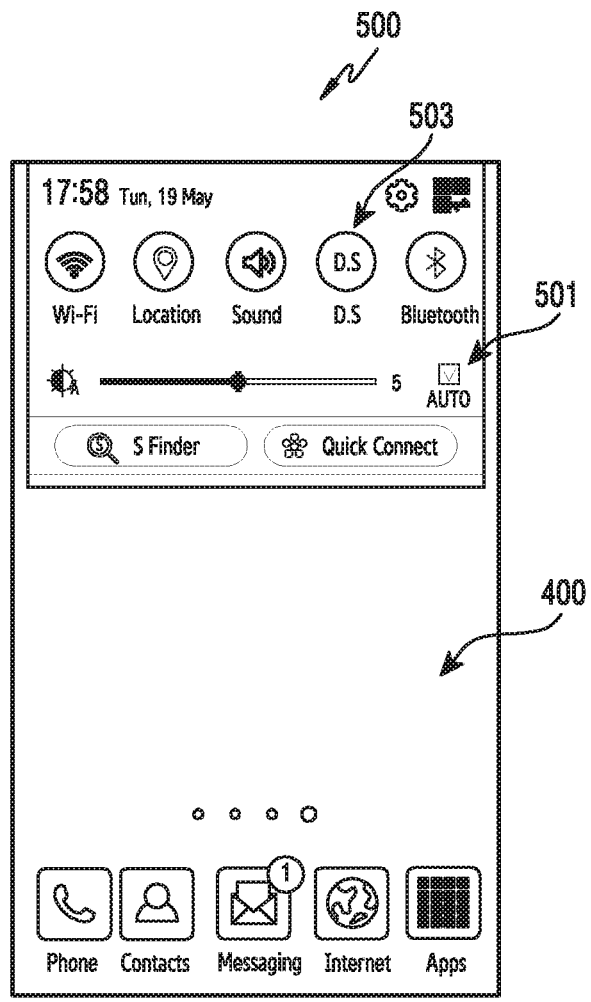
FIG. 5 illustrates a user-interface in the form of a quick access panel, in accordance with an embodiment of the invention.

FIG. 5 illustrates a user-interface 501 in the form of a quick access panel, in accordance with an embodiment of the invention.

Referring to FIG. 5, The user-interface 501 depicts the single-input data saving mode icon 503 along with one or more icons corresponding to various applications and/or functionalities such as volume icon, Bluetooth icon, location icon, and brightness feature. In an example, the electronic device 400 is a smart phone. Therefore, the display unit 401 of the electronic device 400 further includes icons corresponding to contacts, menu, browser, and phone.

In another aspect of the present invention, the user-interface corresponds to a page of an application available on the electronic device 400. In an example, the single-input data saving mode is available as a page of the application.

Figure 6:
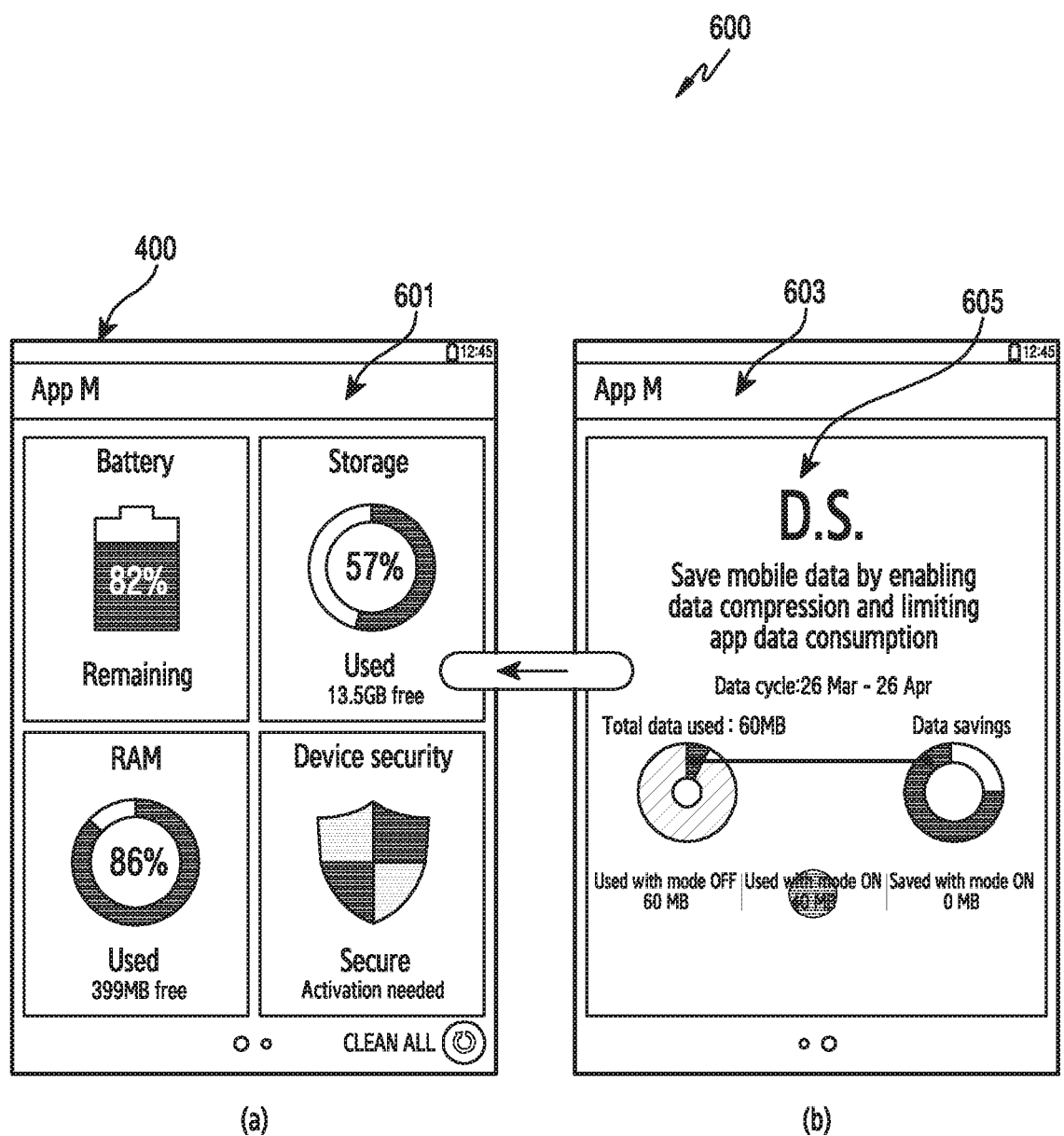
FIG. 6 illustrates a user-interface corresponding to a page of an application, in accordance with an embodiment of the invention.

FIG. 6 illustrates the user-interface corresponding to a page of an application, in accordance with an embodiment of the invention.

Referring to FIG. 6, (a) of FIG. 6 illustrates a screenshot 600 of the electronic device 400 depicting a first user-interface 601 corresponding to an Application Manager, represented as App M. The application manager can be accessed on the electronic device 400 in a plurality of methods, as known in the art. The application M is an application for managing power source, storage, memory usage, and security of other applications or features available on the electronic device 400. The first user-interface 601 depicts one or more icons corresponding to power source, storage, memory usage, and security of other applications. Similarly, (b) of FIG. 6 illustrates the electronic device 400 depicting a second user-interface 603 corresponding to the Application M. The second user-interface 603 depicts the single-input data saving mode 605. In one example, the application M is preloaded in the electronic device 400. In another example, the application M is downloaded on the electronic device 400 via network.

Accordingly, the receiving unit 402 receives a user-input corresponding to accessing the single-input data saving mode from the user-interface 501 or 603. Upon receiving the user-input, the analysing unit 403 provides a user-interface corresponding to the single-input data saving mode on the display unit 402 for configuring the single-input data saving mode.

Figure 7:
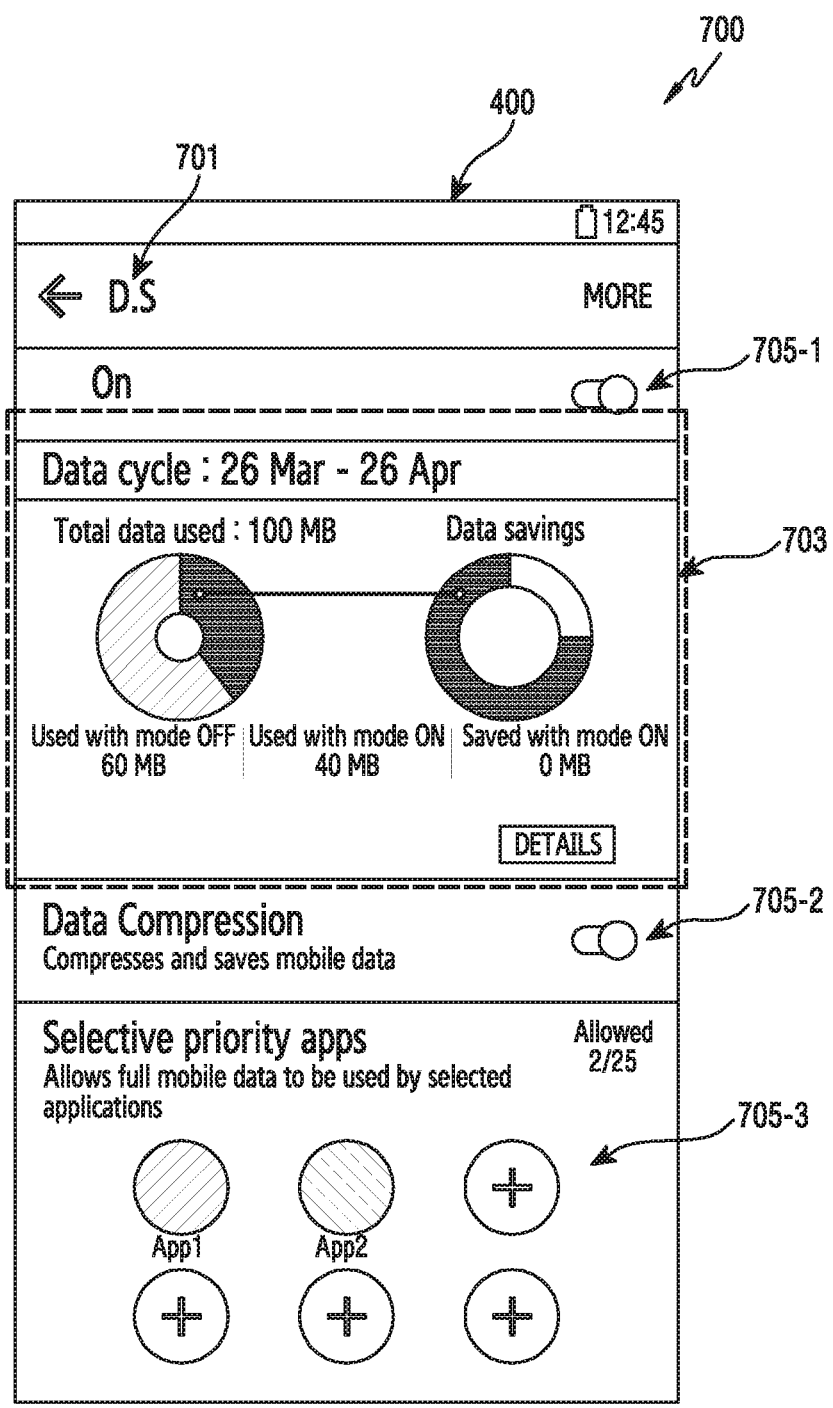
FIG. 7 illustrates a user-interface corresponding to the single-input data saving mode, in accordance with an embodiment of the invention.

FIG. 7 illustrates the user-interface corresponding to the single-input data saving mode, in accordance with an embodiment of the invention.

Referring to FIG. 7, there is illustrated a screenshot 700 of the electronic device 400 depicting a first user-interface 701 corresponding to the single-input data saving mode. The first user-interface 701 includes notification area 703 depicting information about data usage of the electronic device 400. The information includes a period for monitoring data usage of the electronic device 400, total data used by the electronic device 400 in the period, data saved by the electronic device 400 in the period.

Further, the first user-interface 701 includes a plurality of user-selectable tasks 705 enabling the user to configure the single-input data saving mode. Accordingly, a first user-selectable task 705-1 enables/disables the single-input data saving mode. In an example, the first user-selectable task 705-1 is depicted as toggle button.

A second user-selectable task 705-2 enables/disables data compression feature when the single-input data saving mode is enabled. In an example, the second user-selectable task 705-2 is depicted as toggle button. Upon enabling data compression feature, the data controlling unit 404 compresses data being transmitted over the network, thereby further reducing data usage of the electronic device 400.

A third user-selectable task 705-3 enables the user to select one or more applications from a plurality of applications available on the electronic device 400 such that complete data usage is allowed for the selected applications. The applications are designed to provide various services/functionality to the user by accessing data via the network. Examples of the applications include, but not limited to, chat applications, mail applications, browser applications, messaging applications, e-commerce applications, social media applications, data based media applications, location-based service (LBS) applications, print/scan/fax applications, and search applications. Such applications can be either downloaded onto the electronic device 400 or preloaded in the electronic device 400.

Further, in one aspect of the present invention, the user can select a predetermined number of applications. In an example, the third user-selectable task 705-3 is depicted as an icon on the first user-interface 701 such that a number of such icons is equal to the predetermined number of applications. The user can access the third user-selectable task 705-3 by providing a user-input. Examples of the user-input include touch based gesture input, non-touch based gesture input, input from an input device communicatively coupled to the electronic device 400.

Accordingly, the receiving unit 402 receives the user-input corresponding to accessing the third user-selectable task 705-3 from the user-interface 701. Upon receiving the user-input, the analysing unit 403 provides a user-interface corresponding to the third user-selectable task 705-3 on the display unit 402 for selecting one or more applications.

Figure 8:
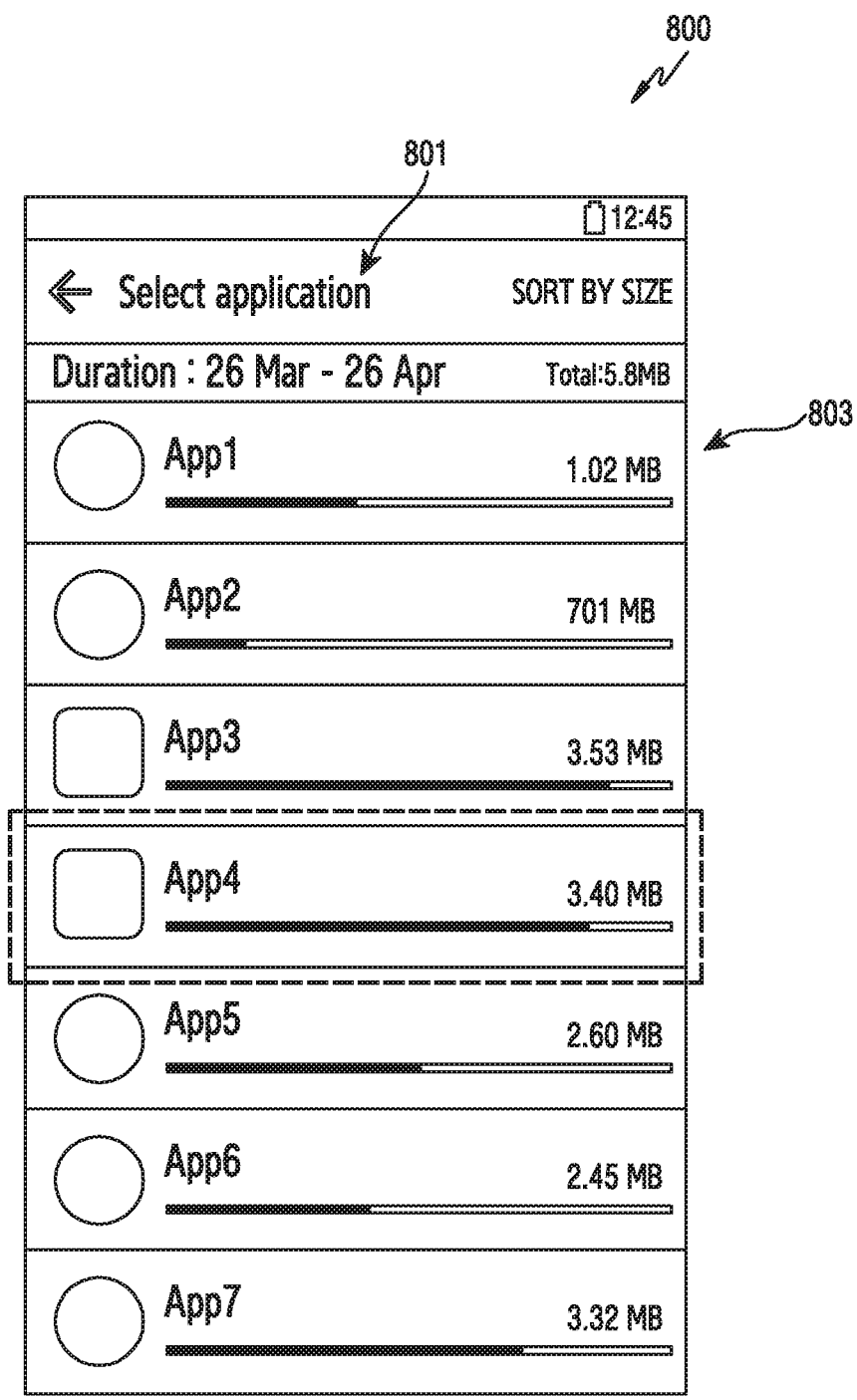
FIG. 8 illustrates a list of a plurality of applications, in accordance with an embodiment of the invention.

FIG. 8 illustrates a list of a plurality of applications, in accordance with an embodiment of the invention.

Referring to FIG. 8, there is illustrated a screenshot 800 of the electronic device 400 depicting a second user-interface 801 corresponding to selection of applications. The second user-interface 801 depicts a list 803 the plurality of applications currently accessing data via network on the electronic device 400. For ease of reference and sake of brevity, seven applications are depicted as App1, App2, App3, App4, App5, App6, and App7. It would be understood that more than seven applications can be depicted on the second user-interface 801 that can be accessed via scrolling mechanism available on the second user-interface 801.

The second user-interface 801 further depicts the applications App1, App2, App3, App4, App5, App6, and App7 by way of an icon representing the application, a text indicating a name of the application, a text indicating a current/total data usage/consumption of the application, and a status bar indicating a current/total data usage/consumption of the application. In addition, the second user-interface 801 depicts a text corresponding to total data usage/consumption of the all the applications App1, App2, App3, App4, App5, App6, and App7. Additionally, the second user-interface 801 provides various options for arranging the applications. Examples of such options include sorting by data and sorting by application. The options can be depicted on the second user-interface 801 via icons, text, and other indicators, as known in the art.

Further, the receiving unit 402 receives a user-input to select one or more applications from the list 803 by providing a user-input. Examples of the user-input include touch based gesture input, non-touch based gesture input, input from an input device communicatively coupled to the electronic device 400. Upon receiving the user-input, the analysing unit 403 adds the selected application in a priority list indicative of allowance of complete data usage for the selected application. The analysing unit 403 further saves the priority list in a memory (not shown in the figure) of the electronic device 400. Upon adding the selected application, the analysing unit 403 depicts the selected application on the first user-interface 801.

Accordingly, referring to FIG. 7 again, the first user-interface 701 depicts two applications App1 and App2 that have been prior added to the priority list. In an example, the applications App1 and App2 are overlaid on the third user-selectable task 705-3 icon. In addition, the first user-interface 701 depicts information corresponding to number of applications available on the electronic device 400 and number of applications selected by the user.

Figure 9:
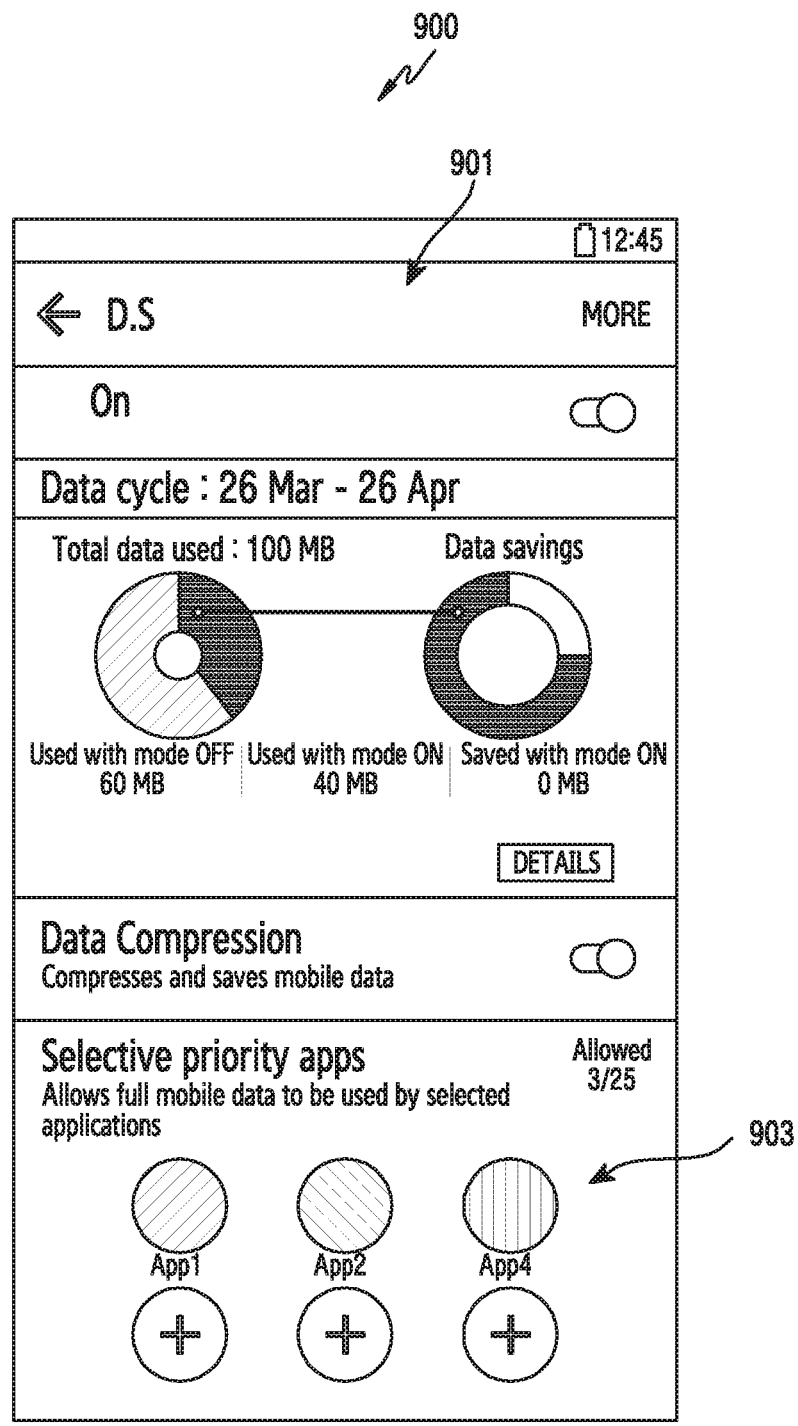
FIG. 9 illustrates selective priority applications, in accordance with an embodiment of the invention.

FIG. 9 illustrates selective priority applications, in accordance with an embodiment of the invention.

Referring to FIG. 9, the first user-interface 901 depicts application App4 selected by the user in the second user-interface 801 (illustrated in the FIG. 8 using a dashed rectangle). Thus, the first user-interface 901 depicts three applications App1, App2, and App4 added to the priority list. In an example, the application App4 is overlaid on the third user-selectable task 903 icon. In addition, the first user-interface 901 depicts updated information corresponding to addition of the application to the priority list. Upon completion of configuration of the single-input data saving mode, the data controlling unit 404 controls the data usage of the selected applications and the remaining applications. Accordingly, the data controlling unit 404 allows complete data usage for the selected applications and restricts data usage for the remaining applications from the list 803 of the applications.

In operation, the receiving unit 402 receives a user-input corresponding to selection and enabling the single-input data saving mode from the user-interface 501 or 603 or 701. Examples of the user-input include touch based gesture input, non-touch based gesture input, input from an input device communicatively coupled to the electronic device 400. In an example, the user-input for accessing the single-input data saving mode and the user-input for selecting and enabling the single-input data saving mode may be different on the same user-interface. In another example, the user-input for accessing the single-input data saving mode and the user-input for selecting and enabling the single-input data saving mode may be same on different user-interfaces.

Further, upon enabling the single-input data saving mode, the analysing unit 403 retrieves the priority list from the memory of the electronic device 400 and identifies the applications present in the priority list. As described earlier, the priority list is a predefined list indicative of mapping of one or more applications with permission for data usage. The priority list includes one or more user-selected applications, as described earlier, or one or more system applications. As described earlier in reference to FIG. 8, the user-selected application is an application selected in the second user-interface 801 from the list 803 of applications. The system applications, on the other hand, perform functions, preferably without user-interaction, necessary for working of the electronic device 400 or applications available in the list 803 of applications. Such system applications are predefined and preloaded in the electronic device 400 at the time of manufacturing the electronic device 400. Examples of such system applications includes applications associated with an operating system of the electronic device 400 and app stores. Thus, the one or more system applications are prior added in the priority list even before the user selects an application from the list 803 of applications. In one aspect of the invention, the priority list may include at least one system application. In another aspect of the invention, the priority list may include at least one user-selected application. In yet another aspect of the invention, the priority list may include at least one system application and at least one user-selected application.

Upon identifying the applications from the priority list, the data controlling unit 404 allows complete data usage for the selected applications and the one or more system applications by allowing foreground data usage and background data usage. In an example, the selected application is a chat application. Accordingly, the data controlling unit 404 allows the chat application to perform both the foreground activities and the background activities by accessing the data via the network. Examples of foreground activities include, but not limited to, transmitting & receiving messages in active chat session. Examples of background activities include, but not limited to, transmitting & receiving messages in inactive chat session, checking location determination unit (not shown in the figure) of the electronic device 400, and checking an external server for allocation updates, location updates, contact updates, last access updates corresponding to each contact.

The data controlling unit 404 further restricts data usage for the remaining applications from the list 803 of the applications. However, the data controlling unit 404 does not restrict data usage for the one or more system applications. Accordingly, the analysing unit 403 identifies applications that are currently running in foreground mode of the electronic device 400, i.e., the application is being used by the user of the electronic device 400. Upon identifying such foreground running applications, the data controlling unit 404 allows foreground data usage and restricts background usage for the identified applications. In an example, the selected application is a chat application. Accordingly, the data controlling unit 404 allows the chat application to perform only the foreground activities such as transmitting & receiving messages in active chat session. However, the data controlling unit 404 restricts the background activities such as transmitting & receiving messages in inactive chat session and checking an external server for allocation updates, contact updates, last access updates corresponding to each contact, from accessing the data via the network. The data controlling unit 404 does not restrict background activities which include location updates.

Further, the analysing unit 403 identifies applications that are currently running in background mode of the electronic device 400, i.e., the application is not being used by the user of the electronic device 400. Upon identifying such background running applications, the data controlling unit 404 restricts both foreground data usage and background usage for the identified applications. In an example, the selected application is a chat application. Accordingly, the data controlling unit 404 restricts both the foreground activities and the background activities from accessing the data via the network. Furthermore, if upon controlling the data usage for the applications, the user adds another application to the priority list, the data controlling unit 404 allows the data usage in accordance with the above embodiment.

Further, in one aspect of the invention, the user may launch an application available on the electronic device 400. Accordingly, the receiving unit 402 receives the user-input corresponding to launching an application. Upon receiving the user-input, the analysing unit 403 determines if the application is included in the priority list. If the application is included in the priority list, the data controlling unit 404 allows complete data usage to the application, as described earlier.

However, upon determining the application is excluded from the priority list, i.e., the application is not listed in the priority list; the analysing unit 403 requests a further user-input to launch the application. In one aspect of the invention, the analysing unit 403 provides a notification message to the user on the display unit 401 indicating the application is excluded from the priority list. Further, the analysing unit 403 requests for the further user-input to launch the application.

Figure 10:
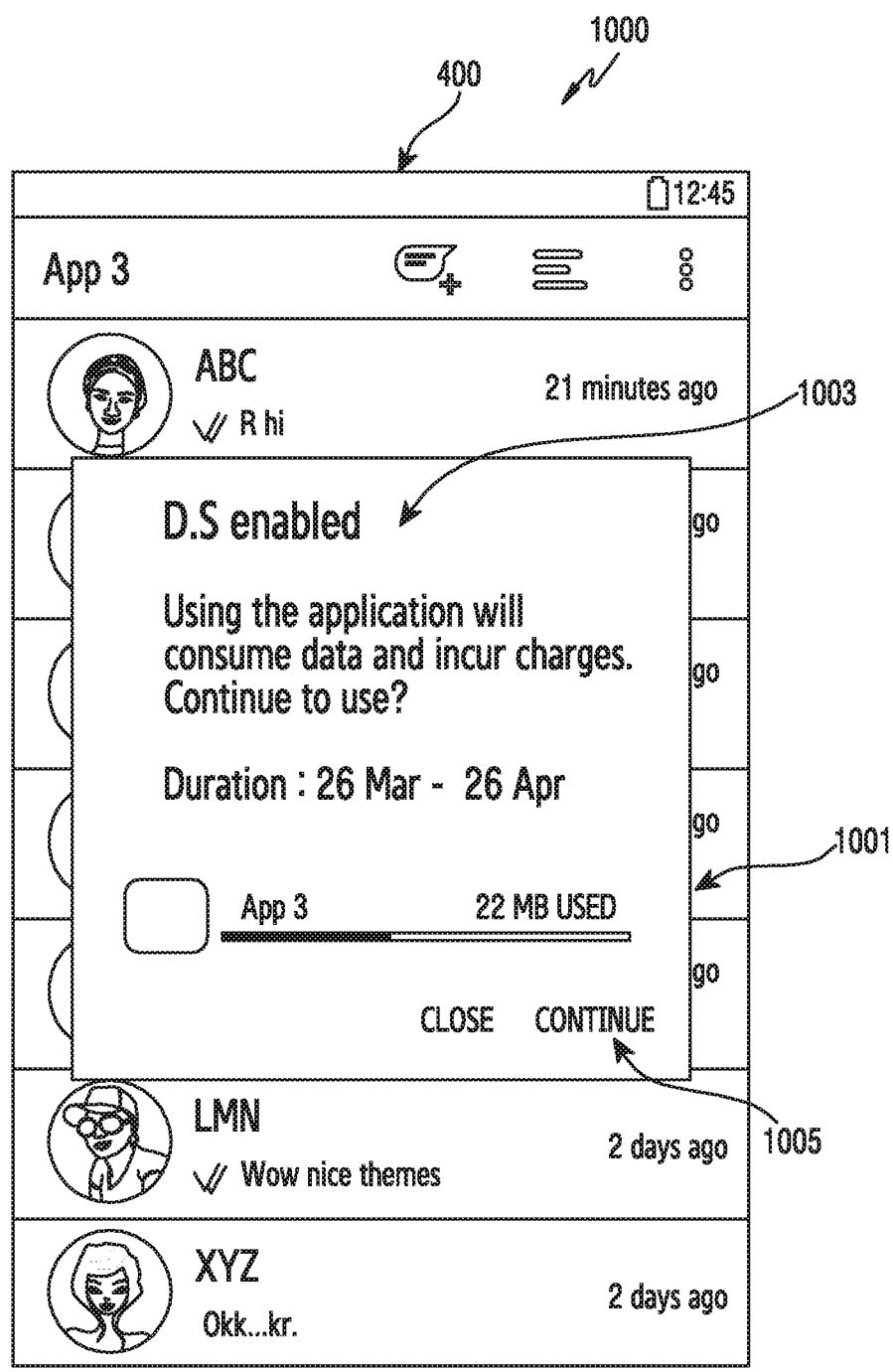
FIG. 10 illustrates a notification message on display unit, in accordance with an embodiment of the invention.

FIG. 10 illustrates a notification message on display unit, in accordance with an embodiment of the invention.

Referring to FIG. 10, there is illustrated a screenshot 1000 of the electronic device 400 depicting a notification message 1001 on the display unit 401. Examples of the notification message 1001 include a flash message and a pop-up message. The notification message 1001 includes a text message 1003 indicating the single-input data saving mode is enabled and launching of the application will consume data. The notification message 1001 further includes a user-task 1005 for enabling the user to launch the application or cancel the launching of the application. Upon receiving the user-input corresponding to launch the application, the analysing unit 403 enables launching of the application and the data controlling unit 404 restricts the data usage of the application by allowing only foreground data usage as described earlier.

Figure 11:
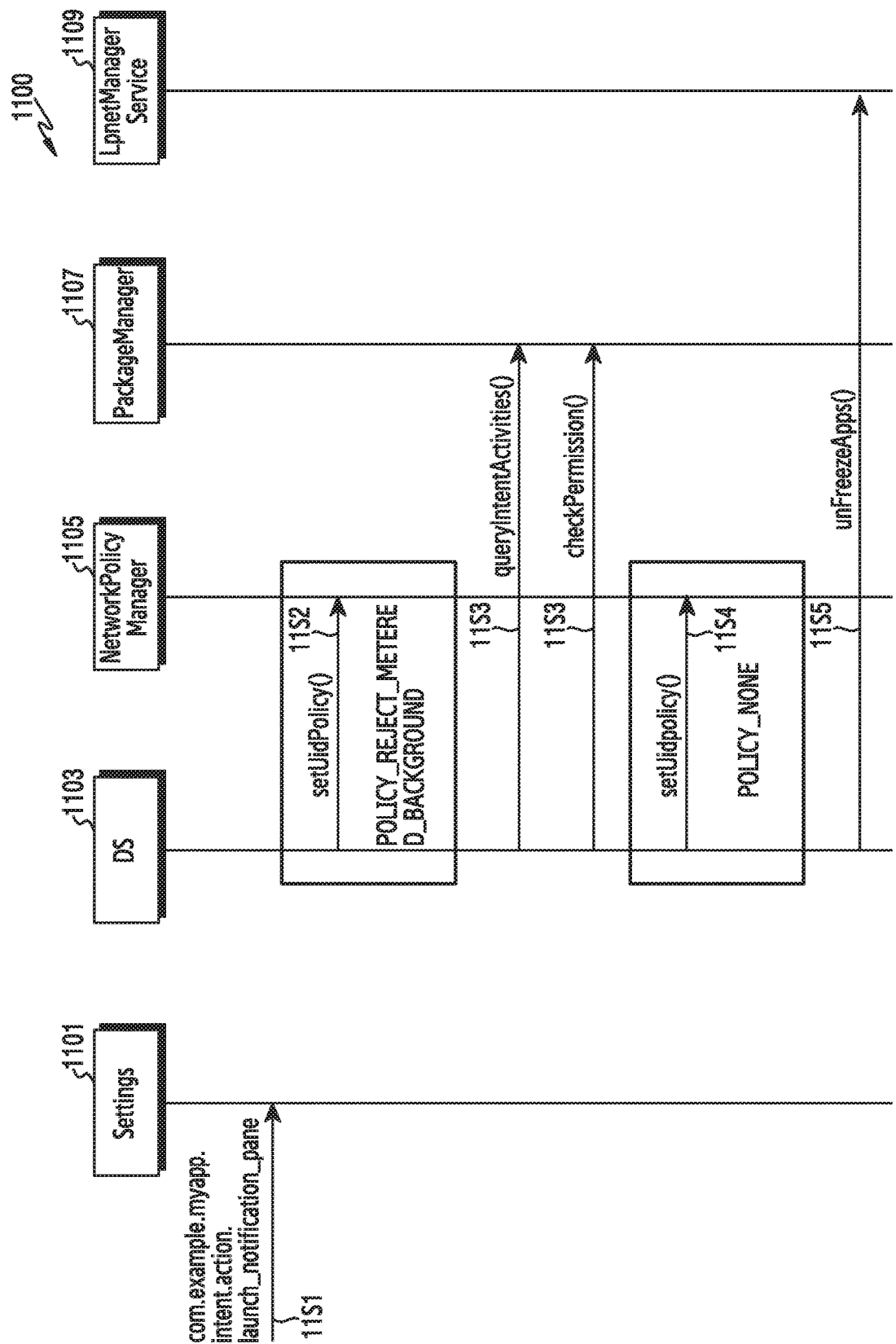
FIG. 11 illustrates an exemplary sequence diagram for controlling/managing the data usage of applications added in the priority list, in accordance with an embodiment of the invention.

FIG. 11 illustrates an exemplary sequence diagram 1100 for controlling/managing the data usage of applications added in the priority list, in accordance with an embodiment of the invention.

Referring to FIG. 11, the analysing unit 403 and the data controlling unit 404 communicates with various modules that include plurality of policies/rules for controlling access to and prioritizing use of network resources available to the electronic device 400. In accordance with the present invention, the modules include network policy manager 1105, package manager 1107, and lpnet manager service 1109. For the sake of brevity, the analysing unit 403 and the data controlling unit 404 are represented as DS 1103

At step 11S1, a settings module 1101 receives the user-input corresponding to enabling the single-input data saving mode, as described above.

At step 11S2, upon being enabled, in one aspect of the invention, the DS 1103 initially restricts background data usage of all the applications available on the electronic device 400, excluding the one or more system applications. Accordingly, the DS 1103 sends corresponding request to the network policy manager 1105. In an example, the DS 1103 sends an application program interface (api) setUID-Policy( ) with parameters UID and POLICY_REJECT_METERED_BACKGROUND to the network policy manager 1105.

At step 11S3, the DS 1103 identifies the applications from the priority list. Accordingly, the DS 1103 queries the package manager 1107. In an example, the applications in the priority list are associated with the parameters android.permission.INTERNET and CATEGORY_LAUNCHER. As such, the DS 1103 sends a query to the package manager 1107 for applications having aforementioned attributes by sending queryIntentActivities( ) api and checkPermission( ) apt.

Further, the DS 1103 saves the information of the applications from the priority list. In an example, the DS 1103 saves the information using Shared Preferences apt.

At step 11S4, the DS 1103 allows complete data usage to all the applications present in the priority list. Accordingly, the DS 1103 sends corresponding request to the network policy manager 1105. In an example, the DS 1103 sends setUIDPolicy( ) api to the network policy manager 1105 in a loop for all the applications present in the priority list with UID and POLICY_NONE parameters. Further, the DS 1103 restricts the data usage of remaining applications excluding the one or more system applications as described above.

At step 11S5, the DS 1103 determines if a new application is added to the priority list. Upon determining, the DS 1103 allows complete data usage to the newly added application.

Accordingly, the DS 1103 sends corresponding request to the lpnetmanager service 1109. In an example, the DS 1103 sends unFreezeApps( ) api for the newly added application to the lpnetmanager service 1107.

Further, the user can deselect the applications from the priority applications. Referring to FIG. 7, the receiving unit 402 receives a user-input corresponding to deselecting the applications via the third user-selectable task 705-3 on the first user-interface 701. Examples of the user-input include touch based gesture input, non-touch based gesture input, input from an input device communicatively coupled to the electronic device 400. In an example, the user-input for accessing the single-input data saving mode and the user-input for deselecting the applications may be different from the user-input for selecting the application. In another example, the user-input for deselecting the applications may be same as the user-input for selecting the application.

Accordingly, referring to FIG. 8, upon receiving the user-input, the analysing unit 403 provides the second user-interface 801. The second-interface 801 indicates the applications added to the priority list in the list 803 of the applications. In an example, the second user-interface 801 changes a colour of the applications added to the priority list. In another example, the second user-interface 801 provides a particular indicator against the applications added to the priority list. Accordingly, to deselect the applications added in the priority list, the user selects the one or more applications already indicated as added to the priority list. Upon receiving the user-input, the analysing unit 403 removes the one or more application from the priority list and saves the updated priority list in the memory. Additionally, the analysing unit 403 removes the one or more application from the first-user interface 701 such that the first-user interface 701 only depicts the applications added in the priority list. Further, upon removing the application from the priority list, the data controlling unit 404 restricts the data usage of the one or more removed applications as described earlier.

Figure 12:
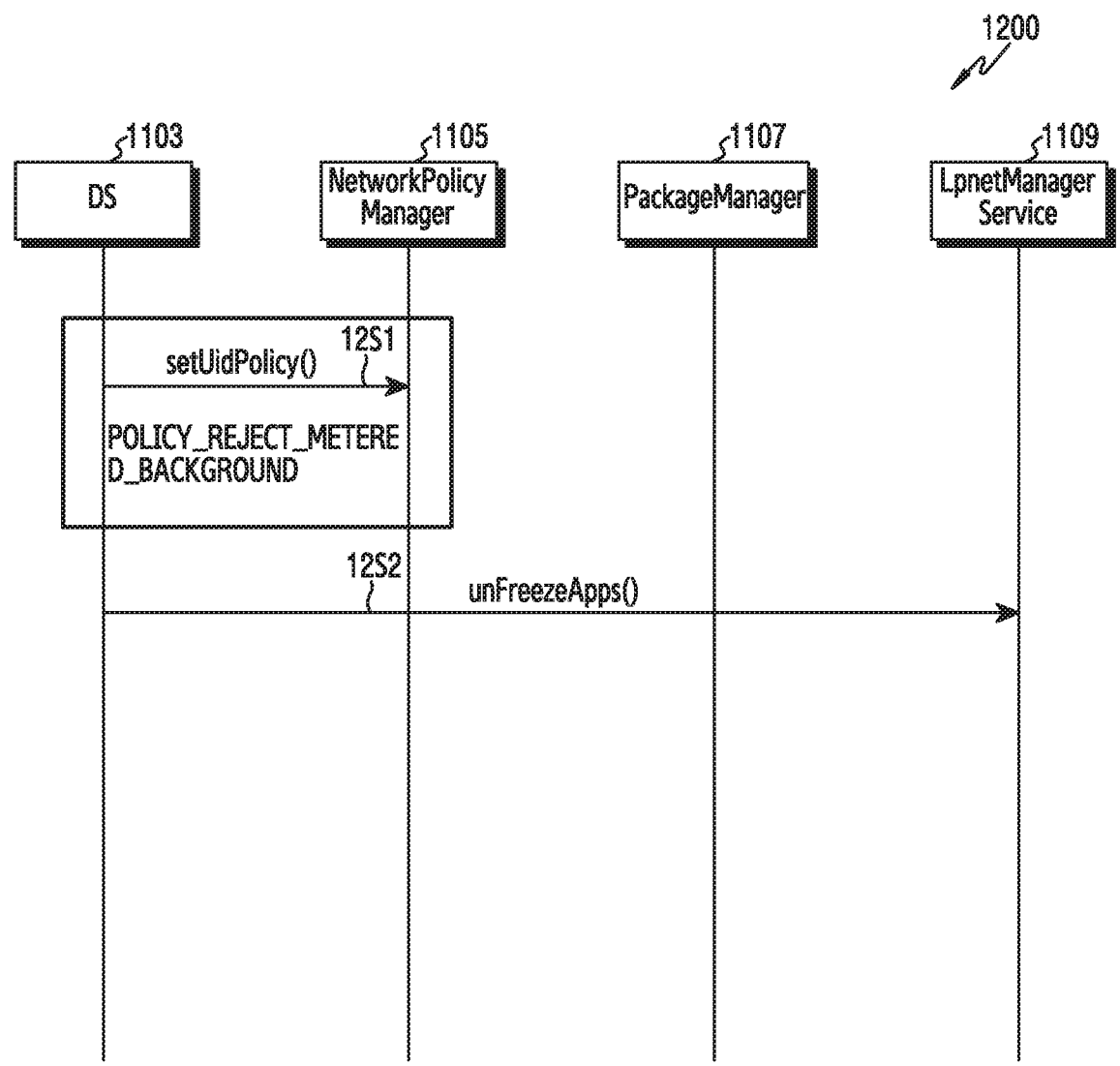
FIG. 12 illustrates an exemplary sequence diagram for controlling/managing the data usage of one or more applications removed from the priority list, in accordance with an embodiment of the invention.

FIG. 12 illustrates an exemplary sequence diagram 1200 for controlling/managing the data usage of one or more applications removed from the priority list, in accordance with an embodiment of the invention.

Referring to FIG. 12, upon removing the application from the priority list, the DS 1103 saves the information of the one or more removed applications. In an example, the DS 1103 saves the information using Shared Preferences api.

At step 12S1, the DS 1103 restricts background data usage to the one or more removed applications. Accordingly, the DS 1103 sends corresponding request to the network policy manager 1105. In an example, the DS 1103 sends setUIDPolicy( ) api to the network policy manager 1105 in a loop for one or more removed applications with UID and POLICY_REJECT_METERED_BACKGROUND parameters.

At step 12S2, the DS 1103 determines if a new application is added to the priority list. Upon determining, the DS 1103 allows complete data usage to the newly added application. Accordingly, the DS 1103 sends corresponding request to the lpnetmanager service 1109. In an example, the DS 1103 sends unFreezeApps( ) api for the newly added application to the lpnetmanager service 1109.

Further, in accordance with the present invention, when the single-input data saving mode is enabled, the analysing unit 403 determines if the electronic device 400 is in a screen-on state or a screen-off state. The screen-on state is a state in which a backlight in the electronic device 400 is turned and the screens-off state is a state in which the backlight in the electronic device 400 is turned off on. Upon determining, the electronic device 400 is in the screen-on state, the data controlling unit 404 controls the data usage of the applications as described earlier.

Conversely, upon determining, the electronic device 400 is in the screen-off state, the data controlling unit 404 determines a predetermined time has elapsed since determining the screen-off state. In an example, the data controlling unit 404 starts a timer to count elapse of the predetermined time. Upon elapse of the predetermined time, the data controlling unit 404 forcibly terminates the remaining applications in the list 803 of the applications and allows complete data usage only to the applications including the system applications listed in the priority list. Thus, the data controlling unit restricts complete data usage of the remaining applications and closes the remaining applications. In an example, the remaining application is game application, which is excluded from the priority list and is currently running in background. As such, the data controlling unit 404 restricts background activities such as checking an external server for game updates, score updates, contact updates or the like, and also restricts foreground data activities by placing the game application in a hibernation state. However, upon determining the screen-off state, the data controlling unit 404 terminates the game application such that, the user launches the game application again to play the game.

Further, upon elapse of the predetermined time, the data controlling unit 404 restricts data usage of to the applications including the system applications listed in the priority list. Accordingly, the data controlling unit 404 allows foreground data usage and restricts background usage for the applications, as described earlier.

Figure 13:
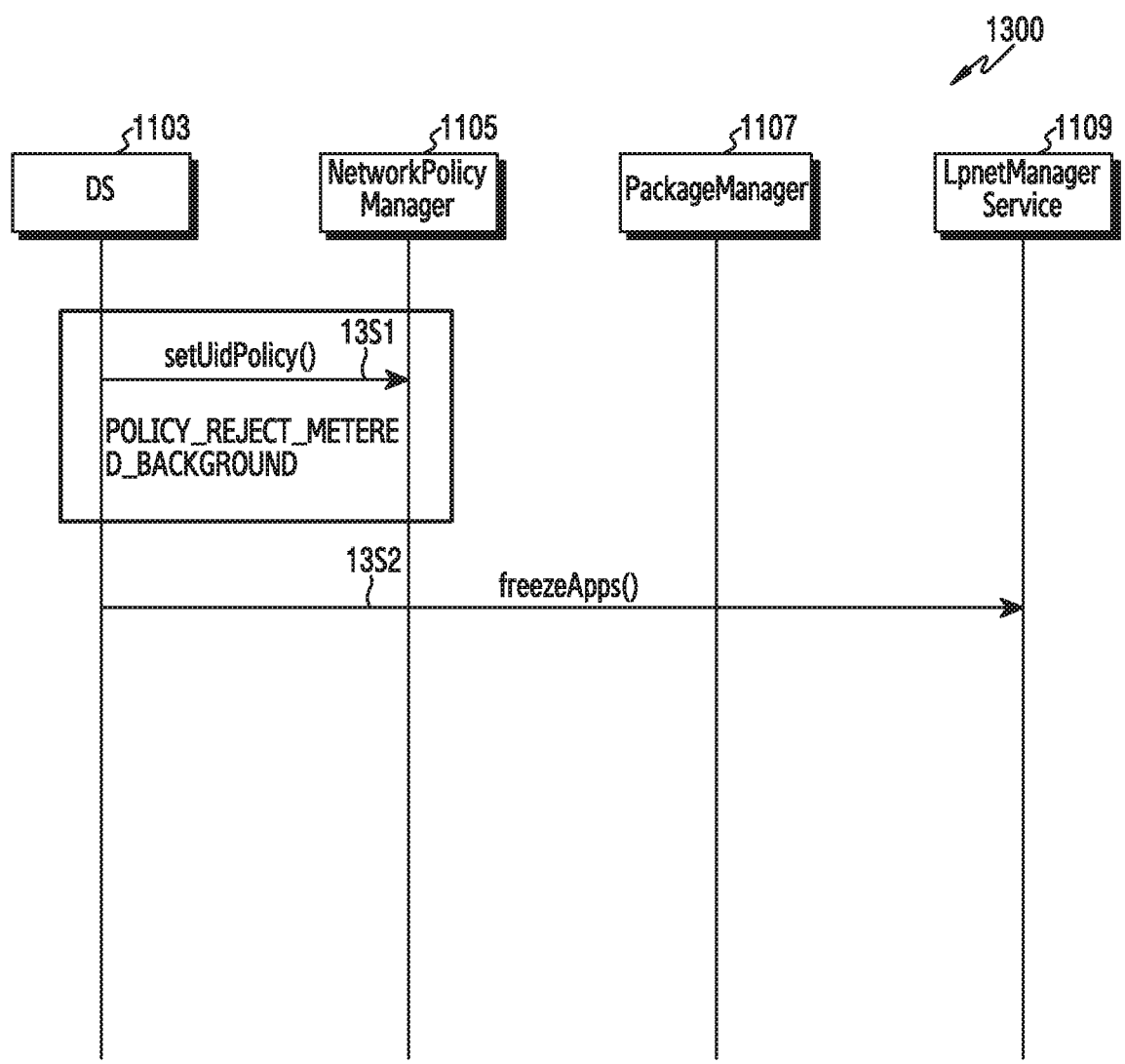
FIG. 13 illustrates an exemplary sequence diagram for controlling/managing the data usage upon detecting screen-off state, in accordance with an embodiment of the invention.

FIG. 13 illustrates an exemplary sequence diagram 1300 for controlling/managing the data usage upon detecting screen-off state, in accordance with an embodiment of the invention.

Referring to FIG. 13, upon detecting the screen-off state, the DS 1103 starts a timer to determine elapse of the predetermined time.

At step 13S1, upon detecting elapse of the predetermined time, the DS 1103 the DS 1103 restricts background data usage of the applications including the system applications listed in the priority list. Accordingly, the DS 1103 sends corresponding request to the network policy manager 1105. In an example, the DS 1103 sends an application program interface (api) setUIDPolicy( ) with parameters UID and POLICY_REJECT_METERED_BACKGROUND to the network policy manager 1105.

At step 13S2, the DS 1103 forcibly terminates the remaining applications in the list 803 of the applications. Accordingly, the DS 1103 sends corresponding request to the lpnetmanager service 1109. In an example, the DS 1103 sends FreezeApps( ) api for the remaining application to the lpnetmanager service 1103.

Further, in one aspect of the invention, upon determining the elapse of predetermined time, the analysing unit 404 determines if an application from the remaining applications is currently running an audio service. Further, the analysing unit 404 determines if the application is now currently running in background mode. Examples of such audio service include streaming media, voice call on telephony network, and voice call on data network. Examples of such application include, but not limited to, network based media application, chat application providing call service, and phone application.

Upon determining, the application is currently running the audio service in background mode, the data controlling unit 404 prevents forcible termination of the application and allows background data usage of the application.

Further, the analysing unit 403 periodically polls the application to determine if the application has terminated the audio service. Upon determining the audio service is terminated, the data controlling unit 404 forcibly terminates the application, as described earlier.

Figure 14:
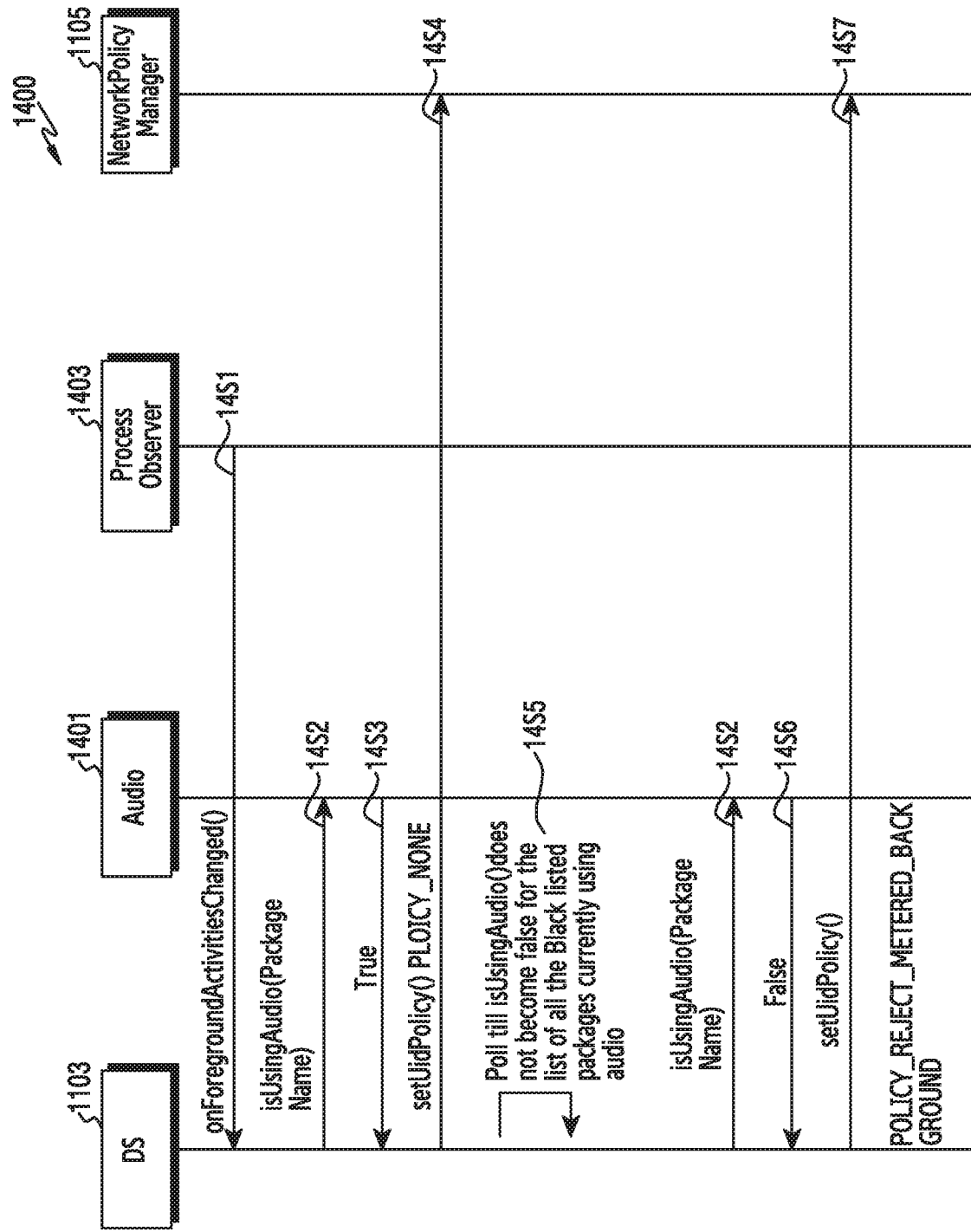
FIG. 14 illustrates an exemplary sequence diagram for controlling/managing the data usage upon detecting screen-off state and detecting an application, from the remaining applications, is currently running an audio service, in accordance with an embodiment of the invention.

FIG. 14 illustrates an exemplary sequence diagram 1400 for controlling/managing the data usage upon detecting screen-off state and detecting an application, from the remaining applications, is currently running an audio service, in accordance with an embodiment of the invention.

Referring to FIG. 14, the DS 1103 communicates with audio module 1401 rendering the audio service and process observer 1403. Upon detecting the screen-off state, the DS 1103 starts a timer to determine elapse of the predetermined time and identifies the application running audio service.

At step 14S1, upon detecting elapse of the predetermined time, the DS 1103 determines if the application currently running the audio server is switched from the foreground mode of the electronic device 400 to the background mode of the electronic device 400. Accordingly, the process observer 1403 sends appropriate message in response to a query from the DS 1103. In an example, the process observer 1403 sends onForegroundActivitiesChanged( ) api to the DS 1103.

At step 14S2, the DS 1103 determines if the application is currently running the audio service in background mode. Accordingly, the DS 1103 sends corresponding request to the audio module 1401. In an example, the DS 1103 sends an isUsingAudio( ) api to the audio module 1401 with package name as a parameter.

At step 14S3, the audio module 1401 sends confirmation regarding the currently running the audio service in background mode. Accordingly, the audio module 1401 sends corresponding response message to the DS 1103. In an example, the audio module 1401 sends a response message indicating 'True' to the DS 1103.

At step 14S4, the DS 1103 allows background data usage to application currently running the audio service. Accordingly, the DS 1103 sends corresponding request to the network policy manager 1105. In an example, the DS 1103 sends setUIDPolicy( ) api to the network policy manager 1105 for the application with UID and POLICY_NONE parameters.

At step 14S5, the DS 1103 polls the audio module 1401 to determine if the application has terminated the audio service in background mode. Accordingly, the DS 1103 sends corresponding request to the audio module 1401, as described at step 10S2.

At step 14S6, the audio module 1401 sends confirmation regarding the termination of the audio service in background mode. Accordingly, the audio module 1401 sends corresponding response message to the DS 1103. In an example, the audio module 1401 sends a response message indicating 'False' to the DS 1103.

At step 14S7, the DS 1103 restricts background data usage of the application. Accordingly, the DS 1103 sends corresponding request to the network policy manager 1105. In an example, the DS 1103 sends an application program interface (api) setUIDPolicy( ) with parameters UID and POLICY_REJECT_METERED_BACKGROUND to the network policy manager 1105.

Exemplary Hardware Configuration

Figure 15:
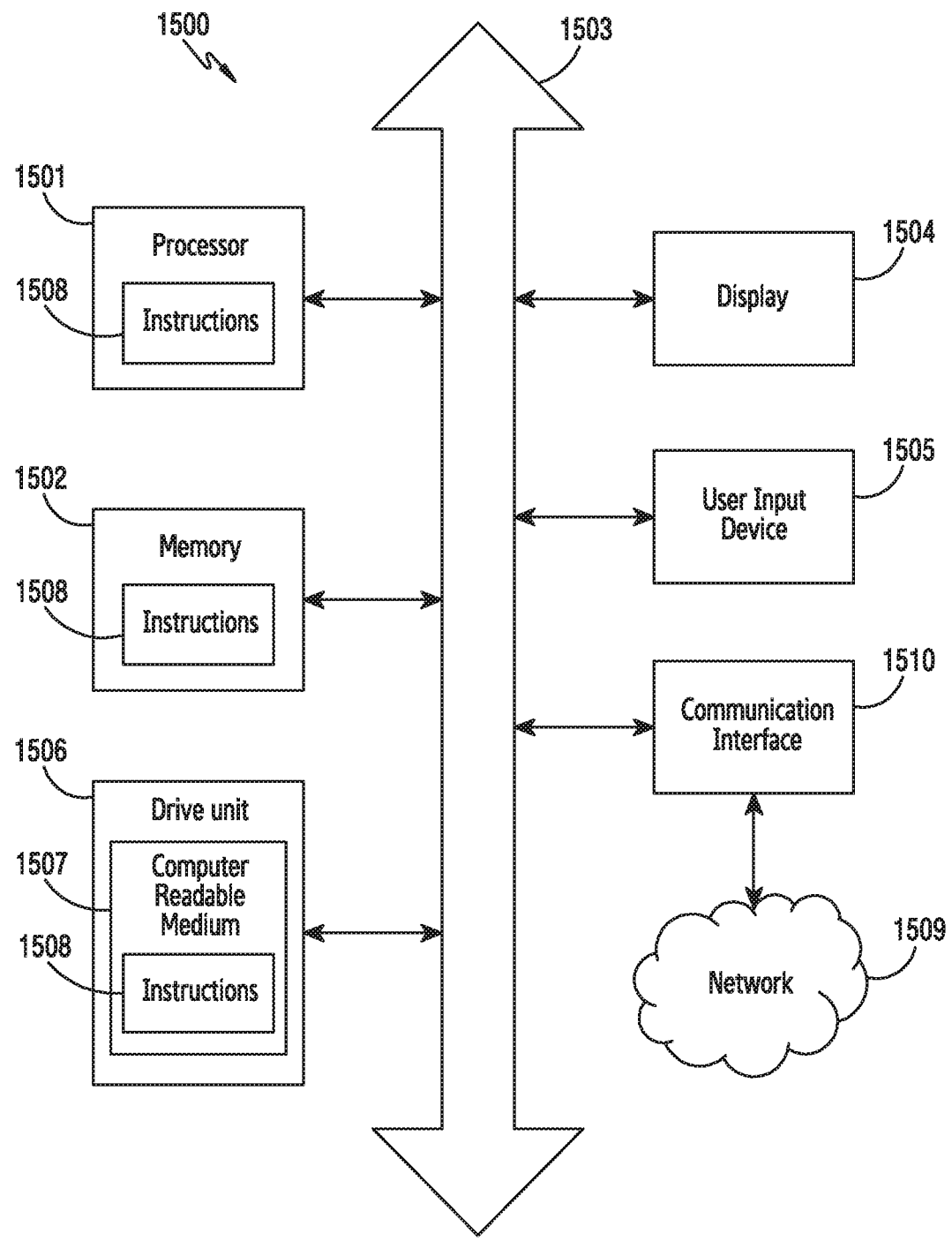
FIG. 15 illustrates a typical hardware configuration of a computing device, which is representative of a hardware environment for practicing the present invention.

FIG. 15 illustrates a typical hardware configuration of an electronic device 1500, which is representative of a hardware environment for implementing the present invention.

As would be understood, the electronic device 400, as described above, includes the hardware configuration as described below.

In a networked deployment, the electronic device 1500 may operate in the capacity of a server or as a client user computer in a server-client user network environment, or as a peer computer system in a peer-to-peer (or distributed) network environment. The electronic device 1500 can also be implemented as or incorporated into various devices, such as, a tablet, a personal digital assistant (PDA), a palmtop computer, a laptop, a smart phone, a notebook, and a communication device.

The electronic device 1500 may include a processor 1501 e.g., a central processing unit (CPU), a graphics processing unit (GPU), or both. The processor 1501 may be a component in a variety of systems. For example, the processor 1501 may be part of a standard personal computer or a workstation. The processor 1501 may be one or more general processors, digital signal processors, application specific integrated circuits, field programmable gate arrays, servers, networks, digital circuits, analog circuits, combinations thereof, or other now known or later developed devices for analysing and processing data. The processor 1501 may implement a software program, such as code generated manually (i.e., programmed).

The electronic device 1500 may include a memory 1502 communicating with the processor 1501 via a bus 1503. The memory 1502 may be a main memory, a static memory, or a dynamic memory. The memory 1502 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. The memory 1502 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1502 is operable to store instructions executable by the processor 1501. The functions, acts or tasks illustrated in the figures or described may be performed by the programmed processor 1501 executing the instructions stored in the memory 1502. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The electronic device 1500 may further include a display unit 1504, such as a liquid crystal display (LCD), an organic light emitting diode (OLED), a flat panel display, a solid state display, a cathode ray tube (CRT), or other now known or later developed display device for outputting determined information.

Additionally, the electronic device 1500 may include an input device 1505 configured to allow a user to interact with any of the components of system 1500. The input device 1505 may be a number pad, a keyboard, a stylus, an electronic pen, or a cursor control device, such as a mouse, or a joystick, touch screen display, remote control or any other device operative to interact with the electronic device 1500.

The electronic device 1500 may also include a disk or optical drive unit 1506. The drive unit 1506 may include a computer-readable medium 1507 in which one or more sets of instructions 1508, e.g. software, can be embedded. In addition, the instructions 1508 may be separately stored in the processor 1501 and the memory 1502.

The electronic device 1500 may further be in communication with other device over a network 1509 to communicate voice, video, audio, images, or any other data over the network 1509. Further, the data and/or the instructions 1508 may be transmitted or received over the network 1509 via a communication port or interface 1510 or using the bus 1503. The communication port or interface 1510 may be a part of the processor 1501 or may be a separate component. The communication port 1510 may be created in software or may be a physical connection in hardware. The communication port may be configured to connect with the network 1509, external media, the display 1504, or any other components in system 1500 or combinations thereof. The connection with the network 1509 may be a physical connection, such as a wired Ethernet connection or may be established wirelessly as discussed later. Likewise, the additional connections with other components of the system 1500 may be physical connections or may be established wirelessly. The network 1509 may alternatively be directly connected to the bus 1503.

The network 1509 may include wired networks, wireless networks, Ethernet AVB networks, or combinations thereof. The wireless network may be a cellular telephone network, an 802.11, 802.16, 802.20, 802.1Q or WiMax network. Further, the network 1509 may be a public network, such as the Internet, a private network, such as an intranet, or combinations thereof, and may utilize a variety of networking protocols now available or later developed including, but not limited to TCP/IP based networking protocols.

In an alternative example, dedicated hardware implementations, such as application specific integrated circuits, programmable logic arrays and other hardware devices, can be constructed to implement various parts of the electronic device 1500.

Applications can broadly include a variety of electronic and computer systems. One or more examples described may implement functions using two or more specific interconnected hardware modules or devices with related control and data signals that can be communicated between and through the modules, or as portions of an application-specific integrated circuit. Accordingly, the present system encompasses software, firmware, and hardware implementations.

The electronic device 1500 may be implemented by software programs executable by the processor 1501. Further, in a non-limited example, implementations can include distributed processing, component/object distributed processing, and parallel processing. Alternatively, virtual computer system processing can be constructed to implement various parts of the system.

The electronic device 1500 is not limited to operation with any particular standards and protocols. For example, standards for Internet and other packet switched network transmission (e.g., TCP/IP, UDP/IP, HTML, HTTP) may be used. Such standards are periodically superseded by faster or more efficient equivalents having essentially the same functions. Accordingly, replacement standards and protocols having the same or similar functions as those disclosed are considered equivalents thereof.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

While certain present preferred embodiments of the invention have been illustrated and described herein, it is to be understood that the invention is not limited thereto. Clearly, the invention may be otherwise variously embodied, and practiced within the scope of the following claims.

What is claimed is:

1. A method for operating an electronic device, the method comprising:
displaying a first user interface including an object for saving data transceived through cellular communication; and
in response to receiving an input on the object,
restricting background data communication through the cellular communication for at least one application installed in the electronic device.

2. The method as claimed in claim 1, further comprising:
displaying a second user interface including a plurality of executable objects for respectively indicating a plurality of applications installed in the electronic device;
receiving at least one input for selecting at least one executable object among the plurality of executable objects; and
based on receiving the at least one input, determining a first set of applications including at least one application indicated by the selected at least one executable object,
wherein the first set of applications is allowed for foreground data communication and the background data communication through the cellular communication, and
wherein a second set of applications comprises the at least one application other than the first set of applications.

3. The method as claimed in claim 1, further comprising:
receiving a drag input from an edge area of a screen of the electronic device being displayed toward an area other than the edge area;
in response to receiving the drag input, displaying a third user interface at least partially superimposed on the screen, the third user interface including the object for saving data; and
based on the receiving of the input on the object included in the third user interface, displaying the first user interface.

4. The method as claimed in claim 2, further comprising:
in response to the receiving of the input on the object, allowing foreground data communication and the background data communication through the cellular communication for the first set of applications.

5. The method as claimed in claim 2, further comprising:
in response to receiving the input on the object, allowing foreground data communication; and restricting the background data communication through the cellular communication for a second set of applications running in foreground mode of the electronic device.

6. The method as claimed in claim 2, further comprising:
in response to the receiving of the input on the object, restricting the background data communication for the second set of applications running in background mode of the electronic device.

7. The method as claimed in claim 1, further comprising:
in response to the receiving of the input on the object, activating a mode of saving data, determining that the electronic device is in a screen-off state while the mode is active, the screen-off state being a state in which a backlight in the electronic device is turned off;
determining that a predetermined time has elapsed since determining the screen-off state; and
based on the determination, terminating running applications included in the at least one application.

8. The method as claimed in claim 7, wherein the running applications excludes one or more applications currently using audio service in background mode of the electronic device.

9. The method as claimed in claim 2, further comprising:
detecting an input to launch an application on the electronic device;
determining if the application is excluded among the first set of applications; and
requesting a further input before the launch of the application, based on the determination.

10. The method as claimed in claim 1, further comprising:
in response to the restricting of the background data communication through the cellular communication, transmitting, to a server, a request message for restricting the at least one application.

11. The method as claimed in claim 2, further comprising:
in response to the determining of the first set of applications, transmitting, to a server, a request message for allowing the foreground data communication and the background data communication of the first set of applications.

12. The method as claimed in claim 7, further comprising:
in response to the terminating of the running applications included in a second set of applications, transmitting, to a server, a request message for restricting foreground data communication and the background data communication through the cellular communication the at least one application.

13. A method for operating an electronic device, the method comprising:
receiving a drag input from an edge area of a screen of the electronic device being displayed toward an area other than the edge area;
in response to the receiving of the drag input, displaying a first user interface at least partially superimposed on the screen, the first user interface including an object for saving data transceived through cellular communication;
based on receiving an input on the object included in the first user interface, displaying a second user interface including a plurality of executable object for respectively indicating a plurality of applications installed in the electronic device;
receiving an input for selecting an executable object among the plurality of executable object; and
based on the receiving of the input for selecting the executable object, restricting background data communication through the cellular communication in an application indicated by the selected executable object.

14. The method as claimed in claim 13, further comprising:
based on the receiving of the input for selecting the executable object, allowing foreground data communication and the background data communication through the cellular communication for at least one application except for the application among the plurality of applications.

15. The method as claimed in claim 13, wherein the restricting background data in the application includes allowing foreground data communication and restricting background data communication through the cellular communication for the application running in foreground mode of the electronic device.

16. The method as claimed in claim 13, wherein the restricting background data in the application includes restricting foreground data communication and the background data communication through the cellular communication for the application running in background mode of the electronic device.

17. The method as claimed in claim 13,
wherein the second user interface further includes a plurality of visual objects respectively corresponding to the plurality of executable objects, and
wherein each of the plurality of visual objects indicates amount of data that has transceived through the cellular communication during a specified period in an application indicated by an executable object corresponding to the each of the plurality of visual objects.

18. The method as claimed in claim 13, further comprising:
receiving at least one input for selecting at least one executable object among the plurality of executable object in the second user interface;
based on the at least one input, determining a first set of applications including at least one application indicated by the selected at least one executable object;
displaying a third user interface including an object for saving data transceived through the cellular communication;
in response to receiving an input on the object included in the third user interface, enabling a mode;
based on enabling the mode, allowing the transceiving data through the cellular communication for the first set of applications; and
based on enabling the mode, restricting the transceiving data through the cellular communication for a second set of applications among the plurality of applications other than the first set of applications.

19. The method as claimed in claim 18,
wherein the third user interface further includes a plurality of items for configuring the first set of applications, at least a portion of the plurality of items indicating an application included in the first set of applications, and
wherein the method further comprises, based on receiving an input on an item, displaying the second user interface.

20. An electronic device comprising:
a display unit;
a communication unit for transceiving data through a cellular communication; and
at least one processor, operatively coupled to the display unit and the communication unit, configured to:

control to display, on the display unit, a first user interface including an object for saving data transceived through the cellular communication, in response to receiving an input on the object, allow the transceiving data through the cellular communication for a first set of applications among a plurality of applications installed in the electronic device, and restrict the transceiving data through the cellular communication for a second set of applications among the plurality of applications other than the first set of applications by at least one of restricting background data communication or restricting foreground data communication for the second set of applications.

* * * * *